(12) United States Patent
Zwickle

(10) Patent No.: US 6,374,771 B1
(45) Date of Patent: Apr. 23, 2002

(54) PET BED HARNESS

(76) Inventor: Traci L. Zwickle, 2590 Pierson St., Lakewood, CO (US) 80215

( * ) Notice: Subject to any disclaimer, the term of this patent is extended or adjusted under 35 U.S.C. 154(b) by 0 days.

(21) Appl. No.: 09/764,226

(22) Filed: Jan. 16, 2001

(51) Int. Cl.[7] ............................................. A01K 1/035
(52) U.S. Cl. ................................................... 119/28.5
(58) Field of Search ................................. 119/285, 769, 119/780, 781, 782, 783, 786, 787, 788, 789, 790, 791

(56) References Cited

U.S. PATENT DOCUMENTS

| | | | | |
|---|---|---|---|---|
| 4,147,129 A | * | 4/1979 | Ruplen ...................... | 119/28.5 |
| 4,597,359 A | * | 7/1986 | Moorman ...................... | 119/1 |
| 4,860,689 A | * | 8/1989 | Stewart ...................... | 119/28.5 |
| 5,123,377 A | * | 6/1992 | Edwards ...................... | 119/28.5 |
| 5,136,981 A | * | 8/1992 | Barreto, III et al. ....... | 119/28.5 |
| 5,311,837 A | * | 5/1994 | Mamer-Boelstorff ....... | 119/28.5 |
| 5,551,373 A | * | 9/1996 | O'Donnell ................. | 119/28.5 |

* cited by examiner

*Primary Examiner*—Thomas Price
(74) *Attorney, Agent, or Firm*—Scott L. Terrell, P.C.; Scott L. Terrell

(57) ABSTRACT

A bed harness for a pet, has a ventral strap, collar strap, and a girth strap, the ventral strap connected between the collar and the girth straps, a stay having a first and second end, the first end attached to the ventral strap at a point in close proximity to the girth strap, a bed having an upper surface, a lower surface, and a central vertical shaft through the surfaces for receiving the second end through the surfaces, and a device for stopping the second end from releasing back through the shaft, the stopping device attached near the second end of the stay at a distance from the first end which allows the pet to sit or stand on, but not move from, the upper surface of the bed. In this manner, the weight of the pet restrains the animal to the desired location of the bed.

10 Claims, 2 Drawing Sheets

PET BED HARNESS

CROSS REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates to harnesses and beds for pets. In particular, it relates to a pet bed and harness which restrains the pet to one location using the weight of the pet on the bed.

2. Description of the Related Art

It is desirable to restrain domestic animals, particularly indoor house pets, to one location, at times when it is difficult for the caretaker to monitor the animal's activities. Existing restraint systems include stake and chain combinations, cages, and pet beds with high side-walls. However, stake and chain assemblies are set in-the-ground and are, therefore, not useful indoors. Moreover, pets are often discontent when restrained in an enclosure, such as a cage, and such enclosures are unsightly, difficult to clean, and awkward to transport and store because of their cubic dimensions. Another disadvantage with such enclosures is that they are often not suitable for use with animals which are different in size.

Thus, what is needed is a comfortable pet restraint system which is versatile in use, easy to clean and store, and which may be used for animals of varying dimensions. The prior art devices do not satisfy these overall needs.

BRIEF SUMMARY OF THE INVENTION

It is therefore an object of the invention to provide a pet restraint system which is versatile in use and easy to clean and store.

It is another object of the invention is to provide a pet bed and harness restraint system which takes advantage of the pet's weight for isolation of the animal.

It is a further object of the invention to provide a pet bed and harness restraint system which is useful with animals in a variety of sizes.

Additional advantages of the present invention will be set forth in part in the description that follows and in part will be obvious from that description or can be learned from practice of the invention. The advantages of the invention can be realized and obtained by the apparatus particularly pointed out in the appended claims.

To overcome the problems of the prior art methods and in accordance with the purpose of the invention, as embodied and broadly described herein, briefly, a bed harness is provided for a pet which has a ventral strap, collar strap, and a girth strap, the ventral strap connected between the collar and the girth straps, a stay having a first and second end, the first end attached to the ventral strap at a point in close proximity to the girth strap, a bed having an upper surface, a lower surface, and a central vertical shaft through the surfaces for receiving the second end through the surfaces, and a means for stopping the second end from releasing back through the shaft, the stopping means attached near the second end of the stay at a distance from the first end which allows the pet to sit or stand on, but not move from, the upper surface of the bed.

BRIEF DESCRIPTION OF THE SEVERAL VIEWS OF THE DRAWINGS

The accompanying drawings, which are incorporated in and which constitute a part of the specification, illustrate at least one embodiment of the invention and, together with the description, explain the principles of the invention.

DETAILED DESCRIPTION OF THE DRAWINGS

Unless specifically defined otherwise, all technical or scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. Reference now will be made in detail to the presently preferred embodiments of the invention, examples of which are illustrated in the accompanying drawings.

Figure 1:
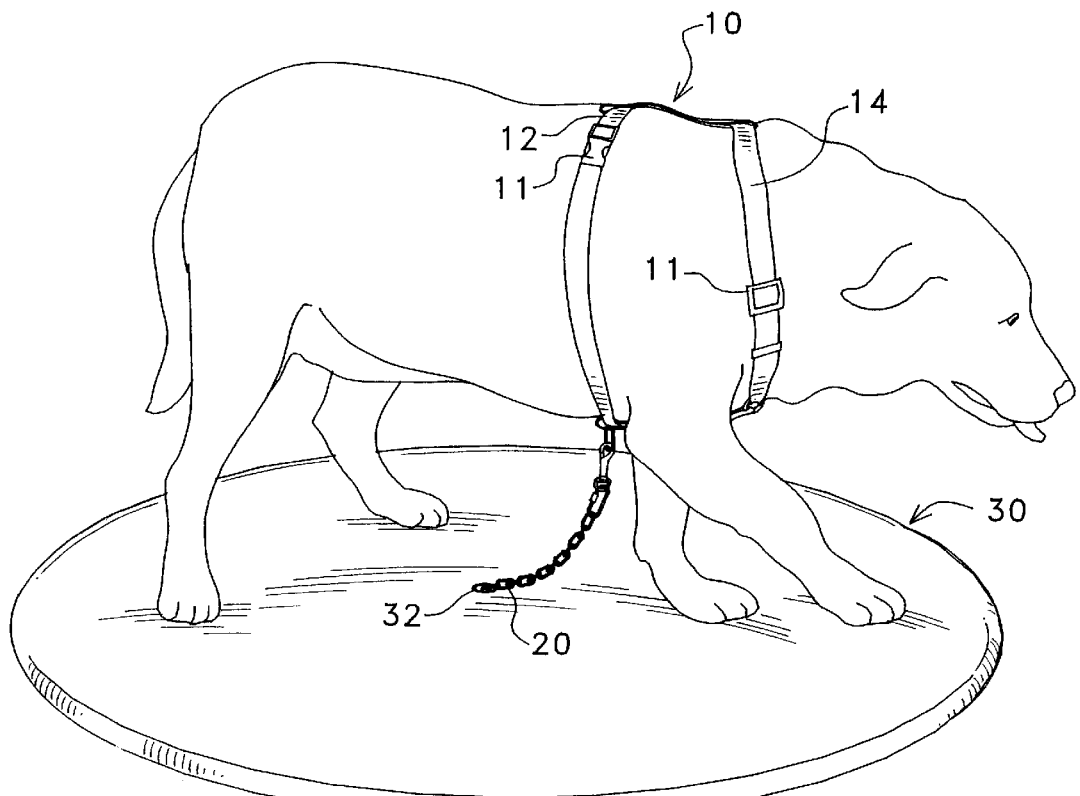
FIG. 1 is an isometric view of the pet bed harness according to the present invention.

Referring now to the drawing figures, wherein like numerals represent like features, it is generally shown in FIG. 1 a dog wearing harness 10 and restrained on bed 30 by means of a stay 20, attached, at the dog's underbelly, to harness 10. The stay 20 travels through a central vertical shaft 32 in bed 30 where it is adjusted to a fixed restraining length. The restraining length is adjusted so that the dog can not move off of the bed surface. In this manner, the weight of the dog holds the bed at the desired location, and the stay is adjustable for use with a variety of differently sized animals.

Figure 2:
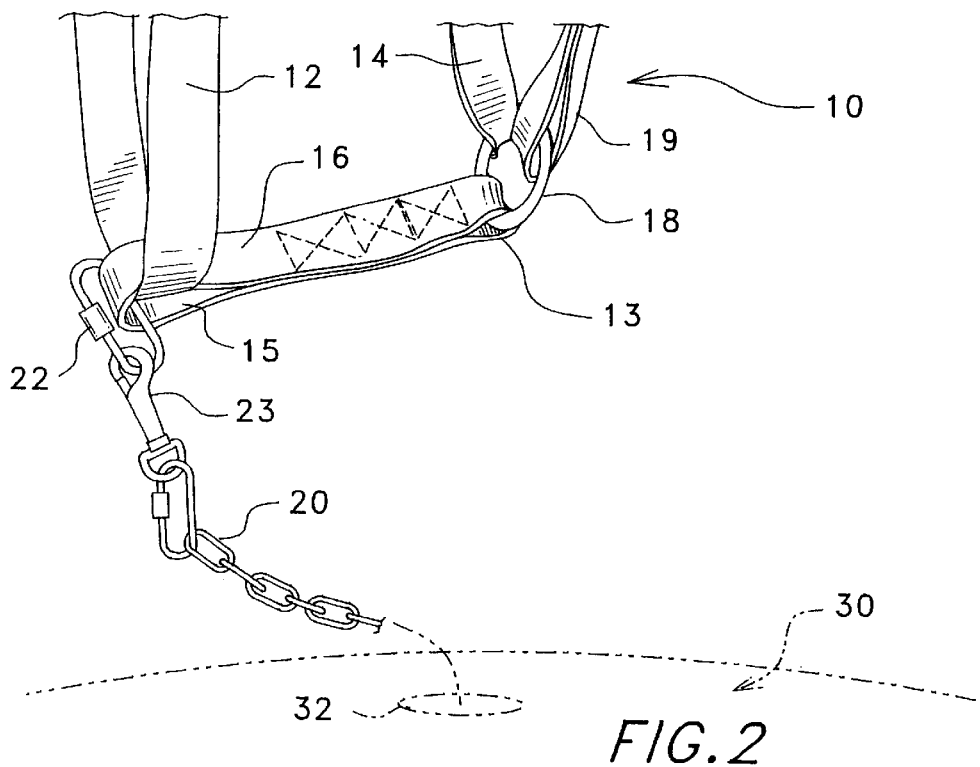
FIG. 2 is a view of the harness collar, girth, and ventral straps showing the location for attachment of the stay in accordance with the present invention.

Referring now to FIGS. 1 and 2, the harness 10 preferably includes a ventral strap 16, which rides along the underbelly of the dog, an adjustable collar strap 14, and an adjustable girth strap 12. The straps are preferably made of a synthetic material, such as nylon, or leather, but can may be made of any suitable material well known in the art. The collar strap 14 and girth strap 12 preferably include buckle systems 11 for adjusting the straps to snugly fit the dog's neck and chest, respectively.

A preferred embodiment of the harness 10 is illustrated in FIG. 2. There, a circular metal ring 18 is used to provide a three-way attachment of the two end loops 19, of collar strap 14, with a loop 13 in the end of the ventral strap 16 which is proximal to the dog's head. The opposing end of the ventral strap 16 also includes a loop 15. The loops 13 and 15 are preferably formed in ventral strap 16 by stitching. The girth strap 12 thereby travels freely within the loop 15, and a metal D-ring 22 (shown in the figure as a quick-link) is housed in loop 15 to easily connect the stay 20 to the dog's underbelly, at D-ring 22, by means of a clip fastener 23 incorporated into the end of the stay 20. The stay 20, is made of any flexible material which is resistant to chewing, such as a metal chain or cable.

Figure 3:
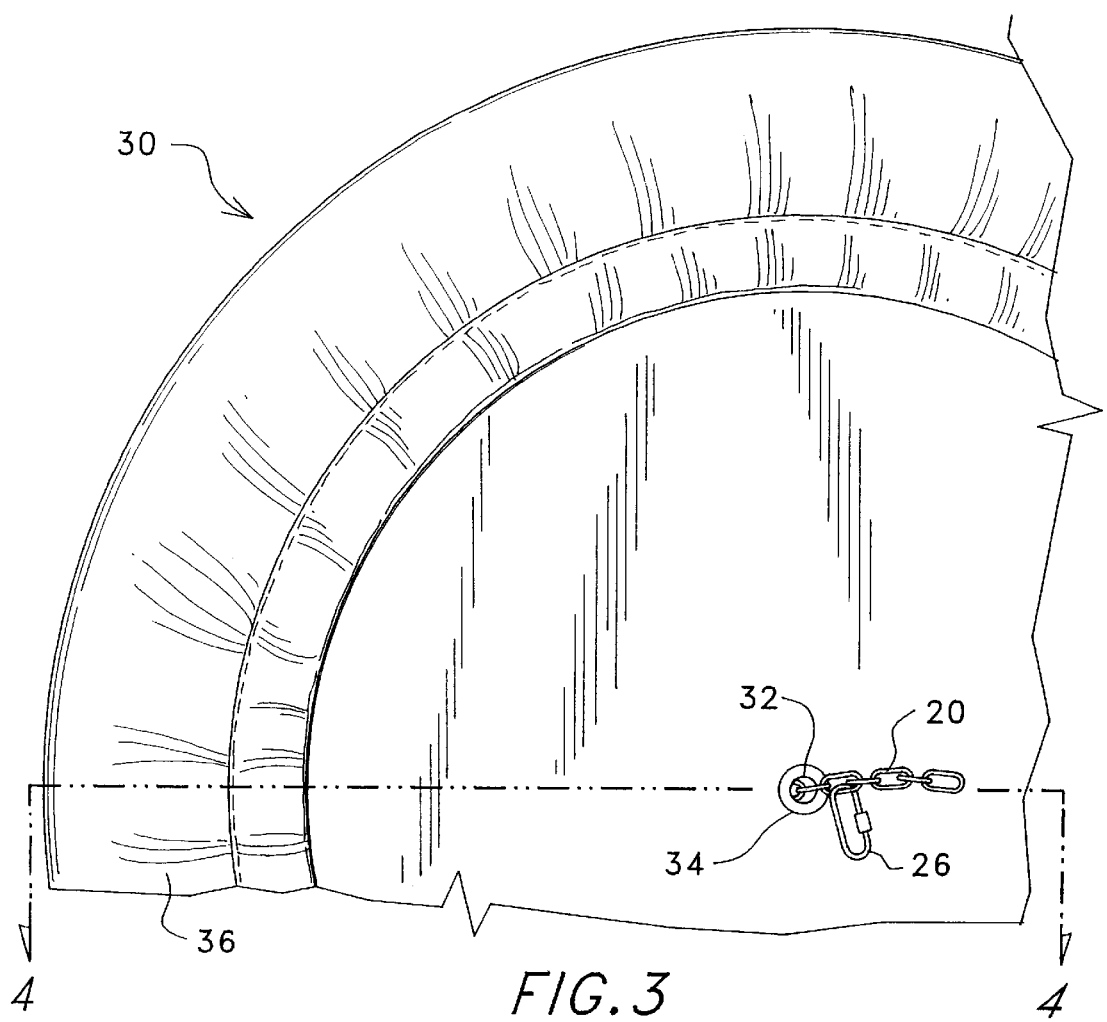
FIG. 3 is a view from the underside of the bed. In the figure it can be seen that the opposing end of the stay travels through a central vertical shaft in the bed. The stay is then secured with a stop used for adjusting the restraining length of the chain. The restraining length is adjusted so that the dog can sit or stand on, but not move from, the bed surface. The invention herein thereby uses the weight of the dog on the bed to restrict its location.

Turning now to FIG. 3, a view from the underside of the bed, the opposing end of the stay 20 travels through a central vertical shaft 32 in the bed 30. The opposing end is secured, so that it does not release back through the shaft, by attaching a removable stop 26 (shown in the figure as a quick link), having a dimension larger than the diameter of the shaft 32, near the end of the stay 20. The stop 26 is attached to the opposing end at a point so as to provide a restraining length which is just long enough for the dog to sit or stand on, but not to move from, the surface of the bed 30. It follows that the surface area of the bed 30 and the overall length of the stay 20 are generally dimensioned for use with animals in a predetermined range of sizes. For example, for an eighty-five pound dog, similar to the one shown in FIG. 1, an overall stay 20 length of approximately seven inches may be included with a bed having a forty-inch diameter, but the same combination could also be used with a smaller dog simply by changing the attachment point of the stop 26 to a position on the stay 20 which limits the desired restraining length as appropriate to the smaller dog.

Figure 4:
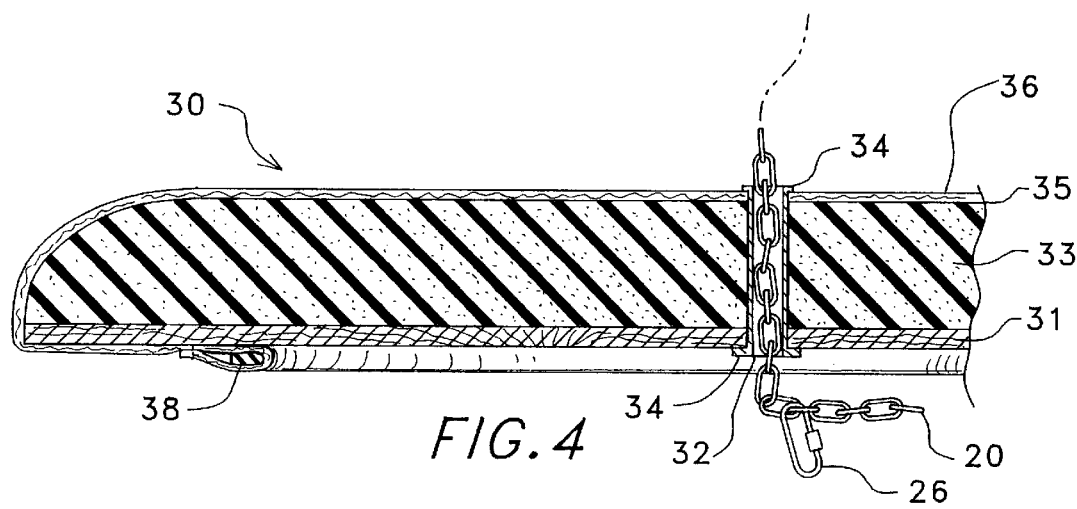
FIG. 4 is a sectional view of the bed showing the central vertical shaft for receiving a chain stay. The stop is fastened to the opposing end of the stay to adjust the restraining length.

Turning now to FIG. 4, a sectional view of the bed 30 is shown to illustrate a more preferred embodiment of the bed 30 assembly. In the figure, a bed base 31, preferably made of a ridged material such as wood or plastic, is preferably covered with a cushion 33, such as a foam pad, to provide a comfortable resting place for the animal while it is restrained. Layered over the cushion 33 is a water proof covering 35, such as vinyl, for ease in cleaning. Even more preferred is the use of a removable soft layer 36, such as a washable fleece, to cover the water proof layer 35. The soft layer 36 can be secured around the top and sides of the base 31 with an elastic band 38 sewn into the peripheral edge of the soft layer. In this manner, the soft layer 36 is easily removed for cleaning and exposing the waterproof layer for sanitizing. When using the cushion, waterproof and soft layers over the base of the bed it is desirable to pinch these layers at the shaft opening 32 with a grommet 34, so that the stay does not tear or abrade the layers. Finally, a plurality of non-skid feet (not shown) may attached to the bottom side of the bed to elevate the bed and to prevent is from skidding when located on a slick surface.

Referring once again to FIG. 1, the pet bed harness, according to the present invention, is easy to use. For example, one can simply turn the bed 30 sideways and insert opposing end of the stay 20 through the bed 30 shaft 32, and connect the stop 26 to the opposing end at a point which approximately fixes the desired restraining length of the stay 20. The bed is then placed at the location where the caretaker desires to restrain the animal. The animal is then placed in the harness 10 by locating the girth 12 and collar 14 straps and adjusting the straps with buckle systems 11 snugly around the animal's chest and neck. It is important that the ventral strap 16 is located along the animal's underbelly such that D-ring 22, for fastening the harness 10 to the stay 20, is located at the animals underbelly, and not under the neck. Once the harness 10 is in place, the stay 20 is simply fastened to the D-ring 22 with clip 23, and the animal is restrained at the desired location.

While the present invention has been described in connection with the illustrated embodiments. It will be appreciated and understood that modifications may be made without departing, from the true spirit and scope of the invention. For example, the bed 30 could be made in a foldable configuration by providing a hinge means along line 4 of FIG. 3, for ease in moving or storage. In addition, the bed may be constructed such that it has a large enough surface area to restrain more than one pet and by providing a plurality of shafts 32 for receiving a plurality of stays 20. In this manner, two or more animals could be restrained at the same location.

What is claimed is:

1. A bed harness for a pet, comprising:
   (a) a ventral strap, collar strap, and a girth strap wherein the ventral strap is connected between the collar and the girth straps;
   (b) a stay having a first and second end, the first end attached to the ventral strap at a point in close proximity to the girth strap;
   (c) a bed having an upper surface, a lower surface, and a central vertical shaft through the surfaces for receiving the second end through the surfaces; and
   (d) a means for stopping the second end from releasing back through the shaft, the stopping means attached near the second end of the stay at a distance from the first end which allows the pet to sit or stand on, but not move from, the upper surface.

2. The bed harness of claim 1 wherein the upper surface further comprises a cushion and a covering.

3. The bed harness of claim 2 wherein the cushion is foam, the covering is waterproof and further comprising a soft layer above the covering.

4. The bed harness of claim 3 wherein the shaft opening in the layers is secured by a grommet.

5. The bed harness of claim 1 wherein the lower surface further comprises a plurality of supporting feet attached to the lower surface.

6. The bed harness of claim 1 wherein the collar strap and the girth strap are adjustable.

7. The bed harness of claim 1 wherein the collar strap includes two ends, each having a loop, the loops further connected to a loop at one end of the ventral strap by a circular ring.

8. The bed harness of claim 7 wherein the ventral strap further comprises a second loop for receiving the girth strap and a D-ring.

9. The bed harness of claim 8 wherein the first stay end further comprises a clip for attaching the first end to the D-ring.

10. The bed harness of claim 1 wherein the stay is a chain or cable.

* * * * *